US006981176B2

(12) United States Patent
Fruehling et al.

(10) Patent No.: US 6,981,176 B2
(45) Date of Patent: Dec. 27, 2005

(54) SECURED MICROCONTROLLER ARCHITECTURE

(75) Inventors: Terry L. Fruehling, Kokomo, IN (US); Troy L. Helm, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 476 days.

(21) Appl. No.: 10/075,972

(22) Filed: Feb. 14, 2002

(65) Prior Publication Data

US 2002/0077782 A1    Jun. 20, 2002

Related U.S. Application Data

(63) Continuation-in-part of application No. 09/309,055, filed on May 10, 1999, now Pat. No. 6,625,688, and a continuation-in-part of application No. 09/309,135, filed on May 10, 1999, now Pat. No. 6,421,790, and a continuation-in-part of application No. 09/309,054, filed on May 10, 1999, now Pat. No. 6,415,394.

(60) Provisional application No. 60/269,065, filed on Feb. 15, 2001.

(51) Int. Cl.[7] ............................................. G06F 11/00
(52) U.S. Cl. .............................. 714/11; 701/31; 701/33
(58) Field of Search .............................. 714/10, 11, 13, 714/45, 25, 36; 701/76, 92, 33, 31, 43

(56) References Cited

U.S. PATENT DOCUMENTS

| 5,029,071 | A | * | 7/1991 | Kinoshita ..................... 714/11 |
| 5,193,189 | A | | 3/1993 | Flood et al. ................. 395/650 |
| 5,195,040 | A | * | 3/1993 | Goldsmith ................... 701/200 |
| 5,404,304 | A | | 4/1995 | Wise et al. ............. 364/426.04 |
| 5,459,732 | A | | 10/1995 | Wise et al. ............. 364/426.02 |
| 5,495,570 | A | * | 2/1996 | Heugel et al. ................. 714/11 |
| 5,825,785 | A | | 10/1998 | Barry et al. ................ 371/22.4 |
| 5,841,867 | A | | 11/1998 | Jacobson et al. ............. 380/25 |
| 5,890,003 | A | * | 3/1999 | Cutts et al. .................. 710/263 |
| 6,006,345 | A | | 12/1999 | Berry, Jr. ..................... 714/718 |
| 6,065,135 | A | * | 5/2000 | Marshall et al. ............. 714/11 |
| 6,097,286 | A | * | 8/2000 | Discenzo .................... 340/465 |
| 6,170,025 | B1 | | 1/2001 | Drottar et al. ............... 710/48 |
| 6,173,416 | B1 | * | 1/2001 | Liddell et al. ................ 714/11 |
| 6,247,151 | B1 | * | 6/2001 | Poisner ....................... 714/718 |
| 6,357,024 | B1 | * | 3/2002 | Dutton et al. ................ 714/45 |
| 6,415,394 | B1 | | 7/2002 | Fruehling et al. |

(Continued)

OTHER PUBLICATIONS

Article: Robert A. Frohwerk, "Signature Analysis: A New Digital Field Service Method", Hewlett-Packard Company, 1977: pp. 2-8.

(Continued)

Primary Examiner—Robert Beausoliel
Assistant Examiner—Marc Duncan
(74) Attorney, Agent, or Firm—David P. Wood

(57) ABSTRACT

A microcontroller unit (MCU) having a primary, or main, processing unit, a secondary processing unit coupled to the primary processing unit, and a common memory coupled to the primary and secondary processing units is disclosed. A functional compare module is coupled to the primary processing unit and the secondary processing unit for comparing a primary output of the primary processing unit and a secondary output of the secondary processing units to detect a fault if the primary output and the secondary output are not the same. The invention provides a method for detecting a fault in the MCU including the steps of reading a control algorithm stored in the common memory by the primary processing unit, reading the control algorithm stored in the common memory by the secondary processing unit, comparing the primary output and the secondary output and responsively detecting a fault, if the primary output does not match the second output.

34 Claims, 8 Drawing Sheets

U.S. PATENT DOCUMENTS

| | | |
|---|---|---|
| 6,421,790 B1 | 7/2002 | Fruehling et al. |
| 6,625,688 B1 | 9/2003 | Fruehling et al. |
| 6,625,809 B1 | 9/2003 | Duff |
| 6,704,628 B1 * | 3/2004 | Fennel et al. ............ 701/29 |

OTHER PUBLICATIONS

Article: E. Böhl, Th. Lindenkruz, R. Stephan, "*The Fail-Stop Controller AE11*", Robert Bosch GmbH—Automotive Equipment Division 8, 72703 Reutlingen, Germany; International Test Conference, Paper 24.1; pp. 567 and 571.

J. Sosnowski, Concurrent Error Detection Using Signature Monitors. Proc. of Fault Tolerant Computing Systems, Methods, Applications. 4th International GI/ITG/GMA Conference, Sep. 1989, pp 343-355.

K. Wilken, J.P. Shen, Continuous Signature Monitoring: Low-Cost Concurrent Detection of Processor Control Errors, IEEE Transactions on Computer-Aided Design, vol. 9, pp. 629-641 Jun. 1990.

Intel Corporation, Embedded PentiumR Processor Family Developer's Manual, "Error Detection," Chapter 22, pp. 393-399.

E. Bohl, T. Lindenkreuz, and R. Stephan, The Fail-Stop Controller AE11, Proc. International Test Conference, IEEE Computer Society Press, Los Alamitos, Calif., 1997, pp. 567-577.

U.S. Appl. No. 09/309,055, filed May 10, 1999, "Method and Circuit for Analysis of the Operation of a Microcontroller Using Signature Analysis of Memory".

U.S. Appl. No. 09/309,135, filed May 10, 1999, "Method and Circuit for Analysis of the Operation of a Microcontroller Using Signature Analysis of Data and Instructions".

U.S. Appl. No. 09/309,054, filed May 10, 1999, Method and Circuit for Analysis of the Operation of a Microcontroller Using Signature Analysis During Operation.

Delphi Secured Microcontroller Architecture by Terry L. Fruehling, SAE 2000 World Congress, Mar. 6-9 2000, pp. 1-12.

* cited by examiner

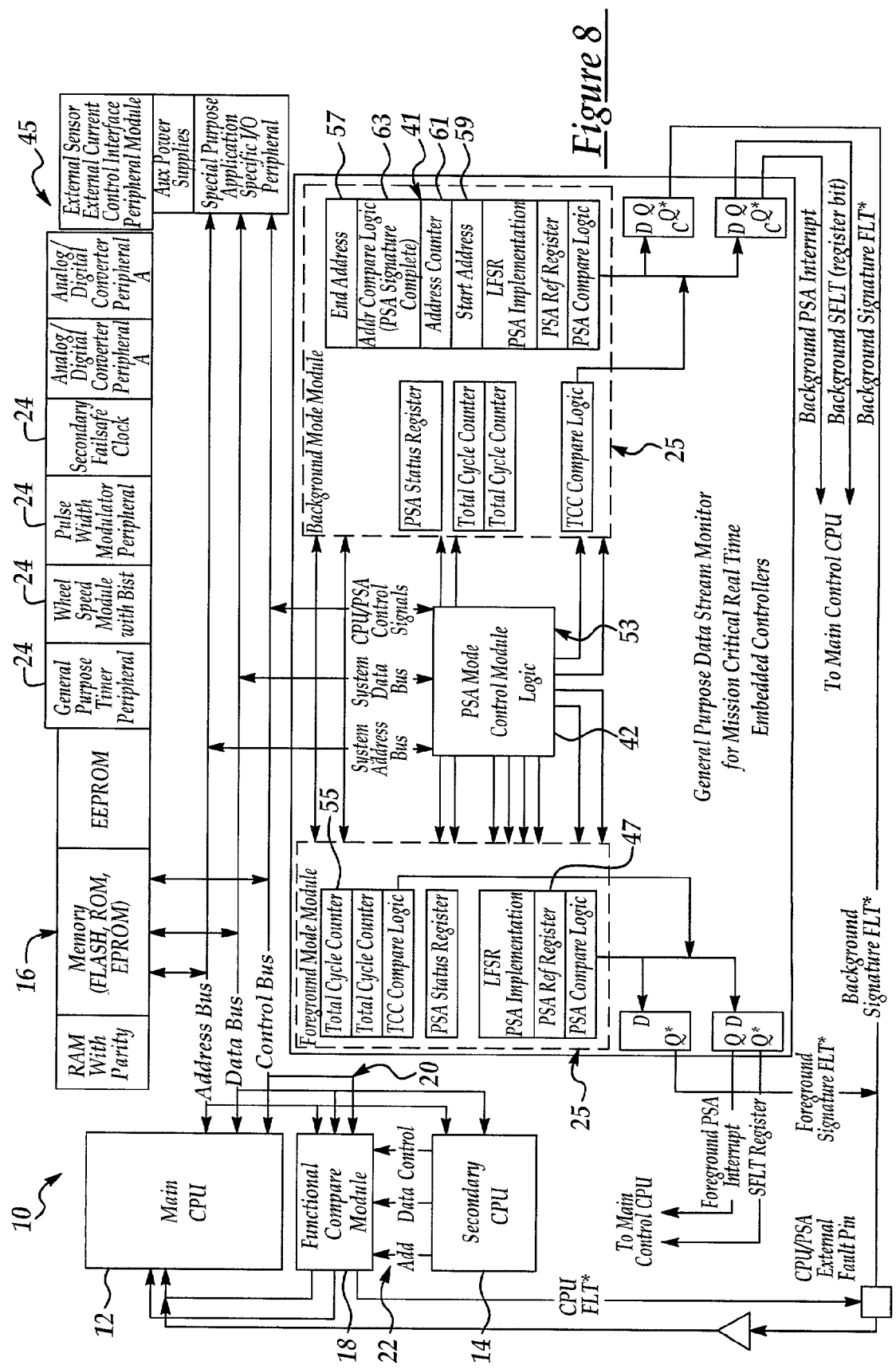

SECURED MICROCONTROLLER ARCHITECTURE

RELATED APPLICATION

This application claims priority to the provisional patent application having Ser. No. 60/269,065, filed on Feb. 15, 2001 and is a continuation-in-part of the utility applications having Ser. No. 09/309,055, now U.S. Pat. No. 6,625,688, Ser. No. 09/309,135, now U.S. Pat. No. 6,421,790, and Ser. No. 09/309,054, now U.S. Pat. No. 6,415,394, all filed on May 10, 1999.

TECHNICAL FIELD

The present invention relates generally to a microcontroller architecture, and more specifically, to a microcontroller architecture having two central processing units.

BACKGROUND OF THE INVENTION

The use of electronics in automobiles is continually increasing. Many electronic applications include a microcontroller unit (MCU) that is comprised of a central processing unit (CPU) and associated peripheral devices. The peripheral devices may be specific or customized to the controller application. These can include communication devices such as serial peripheral interfaces, memory devices such as RAM, ROM/Flash, and EEPROM, timers, power supplies, A/D converters and other devices either built on the same integrated circuit or as separated devices. The CPU and its peripheral devices are linked together by a communications bus.

An MCU dedicated to the control of one subsystem (such as anti-lock brakes-ABS) is said to be embedded in that subsystem. When the MCU is part of an application Electronic Control Unit (such as an ABS ECU) which contains interface circuits for example, to aid in the collection of data or support high current drive requirements, the combination may be referred to as an embedded controller. The method as described, is not limited in use to embedded controllers.

MCU's typically include self-tests to verify the proper operation of the CPU and the associated peripheral devices. The self-test typically will detect illegal memory access decoding, illegal opcode execution or a simple Watchdog/Computer operating properly (COP) test. More fault coverage than this is required for a mission critical system. In a mission critical system, the correct operation of the CPU and the MCU's peripherals (such as timer module, A/D converters, and Communication modules, etc) that comprise the MCU is important for the satisfactory operation of the vehicle. Correct operation of the MCU must be established during the initialization phase following power on, and during repetitive execution of the control program.

Allowing the device under test (such as the CPU) to test itself is a questionable practice. Test methods that are implemented so that execution occurs as the application algorithm is running will be referred to as "On-Line" or "concurrent" testing. Further, "Off-Line" testing will reference the condition when the device is placed in a special mode in which the execution of the application algorithm is inhibited. Off-line testing is used for manufacturing tests or for special purpose test tools, such as those that a technician might use in the field to run unique diagnostic tests. On-line, concurrent testing using redundant software techniques is throughput consuming. The ability of the CPU to test it's own instruction set with a practical number of test vectors is limited at best.

Tens of thousands of test vectors are generated for manufacturing tests, which are required to establish a 99% fault detection level for complex microcontrollers. Writing routines to test the ability of a CPU to execute various instructions by using sample data and the instruction under-test that will be used in the application is practically futile, even if a separate "Test ROM" was included in the system to either:

1. Generate a special set of inputs and monitor the capability of the CPU and application algorithm or a test algorithm to properly respond, or 2. Generate and inject test vectors derived from manufacturing fault detection testing and then evaluate the capability of the CPU to properly process, and produce the correct resultant data at circuit specific observation points.

In a complex system a test ROM would become inordinately large in order to guide the CPU through a limited number of paths or "threads" of the application algorithm. The data used must be carefully selected and necessitates detailed knowledge of the MCU by the test designer. MCU suppliers rarely supply sufficient information to allow effective design. Thus, the first test ROM method would be contrived and limited in its ability to simulate an actual operating environment. If the second technique were employed, and unless all of the manufacturing test vectors were used, the resulting tests would be partial and lengthy. If an attempt were made to isolate the portion of the system that was used and then target it with the proper vectors (to reduce the overall vector quantity), every time the algorithm changed the subset of vectors would be subject to further scrutiny, and possible modification. The technique would have further implementation difficulties for continuous validation of the system in a dynamic run mode of operation. The technique does not consider the concept of monitoring a system based on execution "Dwell Time" in any particular software module or application "Run Time Mode" condition.

Modifying the CPU to have built in-self test (BIST), such as parity to cover the instruction set look up table, duplication or Total Self Check (TSC) circuit designs, etc., of sub-components of the CPU, may result in a significant design modification to a basic cell design. CPU designers are reluctant to modify proven designs for limited applications.

Software techniques that involve time redundancy, such as calculating the same parameter twice, via different algorithms, also require that multiple variables be used and assigned to different RAM variables and internal CPU special function registers. Thus time redundancy also requires hardware resource redundancy to be effective. Because of the substantial amount of CPU execution time needed for redundancy, the CPU requires excess capacity to accomplish the redundant calculations in a real time control application. Because of the added complexity necessary for this implementation of redundancy, the verification process is commonly long and lengthy.

The process of requiring the CPU to perform the self-test is time consuming and inadequate especially in applications having a relatively large memory and with many peripheral devices. To date, the most direct way to solve this problem has been to simply place two microcontrollers into the system. In such systems, each microcontroller is the compliment of the other and each memory and peripheral module is duplicated. Both devices then execute the same code in near lock step. The technique is effective because it checks the operation of one microcontroller against the other. Although the system tests are performed with varied threads through the algorithm, variable dwell in any portion of the application, and with the random-like data that occurs in the actual application environment, the following must be considered:

1. Data faults or hardware faults that may occur are used to calculate system parameters, in a dual microcontroller system these parameters may be filtered before they are compared by the second microcontroller. Thus parametric faults are "second order" to the data or hardware faults that initially created them.

2. Parameters have to be carefully checked against tolerance ranges.

3. The number of times that a miscompare between the two devices actually occurs before a fault is actually logged and responded to must be established.

4. The fail-safe software is not independent from the application algorithm. As adding parameters modifies the application algorithm, fail safe software alterations must also be evaluated.

This technique is not an efficient form of resource allocation. Two identical, fully equipped, microcontrollers doing the same task is expensive. Also, extensive communication software is used to synchronize the data between the two microcontrollers.

Other dual microprocessor systems may use a smaller secondary processor to do a limited check of a few portions of the algorithm, or to accomplish a control flow analysis of the main controller to validate its execution from one module to the next or its ability to transfer to and return from subroutines. These schemes are inherently limited and can only detect a small subset of all possible system faults.

A common technique for verifying the operation of a MCU memory peripheral is to use a check sum. A check sum arithmetically sums the bits of a block of memory. The check sum is then compared to a reference value for that particular time for that block of memory in the operation of the CPU. One disadvantage of check sums is that if two opposing bits of the memory are flipped to the opposite state then the checksum will continue to be proper. This is referred to as aliasing. This technique is also slow, and the memory may not be validated within the time response of the system.

Another technique for verifying the operation of MCU memory peripherals is to use parity. Single bit parity is faster than the checksum method described above, and synchronizes the memory validation with its use in the execution of the application algorithm. It will also however require the memory array design to be modified and it will require decoding by special hardware. The consequences of a parity fault must be processed by the CPU. Single bit parity is also insensitive to double bit flips in a data byte, and the failure to correctly detect data faults is known as aliasing.

To circumvent the problem of adding special hardware to the CPU or software to the application, multiple bit parity schemes and standalone Error Detect and Correct (EDC) processors have been developed. The problem of modifying the memory array to include the extra parity bits still exists. In a typical application, 6 bits may be added to a 16-bit word. Using Hamming Codes, this technique can detect and correct single bit errors, detect but not correct all double bit errors, and detect some triple bit errors.

In the automotive market, check bits added to each word of a memory array are considered an excessive cost burden. The circuits involved are complex, and will add significant cost, but these systems can be integrated into the MCU bus architecture. The draw back to this scheme is that it is intrusive. All data must first be channeled though this device for processing before it is sent to the CPU, adding a delay to the system on every memory read.

There still exists a small amount of configuration software needed to run these devices. If a two or three bit error is detected in the data, an interrupt must be handled to alert the CPU than the affected data is not valid.

Finally, these systems target memory only. The device described in this patent will significantly reduce the possibility of aliasing. Further, the device and method described in this patent will process and detect faults in the CPU instruction streams. The device as described, can ensure that select software modules are processed by the CPU the same way each time they are executed. In this fashion fault detection coverage is added to the memory and the CPU in a single, non-intrusive, cost effective module.

It would be advantageous to verify the MCU memory in automotive applications at startup initialization and during operation of the vehicle. However, to verify that the memory is functioning properly using either the constant checksum or dual microcontrollers with synchronization and data communications software/parameter validation, may place such a burden on the CPU as to slow its operation so that it will not function as required. An alternative may require upgrading the CPU system capacity to re-gain the appropriate throughput. Providing additional capacity increases system cost.

As mentioned before, providing a second microcontroller operating in parallel with the first is not very cost effective. Another disadvantage of previously known verification methods is that the increased complexity of both hardware and software results in degraded reliability of dual MCU systems. Further, increased care must also be taken to reduce EMI susceptibility.

The sequential scheme of first validating the CPU and then the MCU peripheral modules, which is referred to as a "bootstrap" validation system. In general practice the sequential nature of the complete bootstrap fault detection and diagnostic method is only run at the system initialization phase, and the continuous detection of faults is deficient. To circumvent this deficiency this invention describes an enhanced bootstrap scheme that not only executes at system start-up, but also runs continuously and concurrently with the application algorithm.

Additionally, a test ROM may be used to monitor the CPU, but the ROM will become inordinately large in order to adequately guide the CPU through a limited number of paths or "threads" of the application algorithm. The test vectors used must be carefully selected and requires intimate and detailed knowledge of the control algorithm software. Even if the "application systems" fail-silent design implementation could effectively monitor every module, the end result would be of limited utility when considering the range of parameters that can be involved for any given software module. Thus the test ROM method would be contrived and limited in its ability to simulate an actual operating environment.

Any attempt made to identify only the used portion of the MCU in order to target the subset with the proper vectors (to reduce the overall vector quantity) would require detailed scrutiny and modification every time the algorithm changed so that the appropriate changes are made to the test vector set. This approach requires detailed knowledge of the MCU and can only be accomplished with the active participation of the MCU manufacturer. The technique, although useful for an initial start-up verification would have implementation difficulties for continuous validation of the system in a dynamic run mode of operation.

Software techniques that involve time redundancy such as calculating the same parameter twice via different (diverse)

algorithms, also require that multiple variables be used and assigned to different RAM variables and internal CPU special function registers, i.e., time redundancy requires hardware resource redundancy to be effective. Because of the substantial amount of CPU execution time needed for redundancy the CPU processing capacity must be doubled to accomplish the redundant calculations in a real time control application. Because of the added complexity necessary for this implementation of redundancy, the verification process is commonly long, lengthy, costly and prone to human errors and omissions. Software diagnostics should be devoted to identifying improper behavior in the overall system, not to testing microcontroller hardware.

The related art systems are characterized by one or more inadequacies. It would be advantageous to provide a cost-effective system that allowed for continuous monitoring of the CPU. Additionally, it would be advantageous to provide a controller which detects faults real-time and can self determine the fault at its source and then evaluate the appropriate response.

SUMMARY OF THE INVENTION AND ADVANTAGES

In one aspect of the present invention, a controller for a system is provided. The controller includes a primary processing unit coupled to the system and functional compare logic along with a secondary processing unit also coupled to the MCU System having same functional compare logic. The functional compare module (FCM) coupled to the primary processing unit and the secondary processing unit is used for comparing outputs of the primary and secondary processing units. The system also includes a Data stream monitor (DSM) used to continuously monitor the coherency of the static memory and monitor the CPU as it executes code from memory, further this module continuously monitors the configuration registers of the peripheral support modules of the MCU system.

The controller of the subject invention is referred to as a dual CPU/FCM/DSM or simply, as a Secured Microcontroller Architecture (SMA) system, which is incorporated into a single microcontroller unit (MCU). In such a system, each CPU operates from the common memory. The main function is to compare the operation of the extra CPU with the primary CPU in the functional compare module. The step by step (or lock step) code execution of the dual CPUs is compared as the two devices execute out of the same memory. If the data from the memory is corrupt, it will be discovered at a later step in the validation process, and is one of the functional objectives of the DSM. To ensure that the CPUs are healthy, both CPUs must respond to the same data in exactly the same way. The dual CPU system employs continuous cross-functional testing of the two CPUs as multiple paths are taken through the application algorithm. If the system dwells in one software module or mode disproportionately to others, the testing is similarly proportionate. Further, the random-like parameter data is "operated on" by the algorithm and any inappropriate interaction with the current instruction data stream is detected. This technique is effective for all environmental conditions such as temperature, voltage, or Electro-Magnetic Interference (EMI).

In the Secured Microcontroller Architecture (or SMA, and based upon the dual CPU building block) concept, successful testing of peripheral modules by the main CPU is predicated on it's correct state of health (the ability of the CPU to execute the algorithm as intended), and the "Built In Self Test" (BIST) circuits incorporated into the MCU peripheral modules. The job of the secondary CPU/Functional Compare Module is to guarantee the correct state of health of the main CPU. Then, as a secondary step, the Main CPU methodically tests all subordinate peripherals by exercising or polling their unique BIST circuits.

Accordingly, the subject invention overcomes the inadequacies of the related art systems. The subject invention automatically captures and stores the location of the fault and what the CPU was executing at the time of the first fault. The system ensures that the microcontroller is operating as intended and is able to correctly process input data and output controls as required by the application algorithm. The system also ensures data execution coherency. In this context, coherency is defined as stable data, or the absence of flipped bits, stuck bits, transient and noise or any intermittent inconsistencies in the data stream. The system increases the deterministic fault coverage of the fail-silent system architecture and detects and responds to faults within the time response of the system. The system also minimizes the fail-silent implementation dependency on the application algorithm. The fail-silent system is intended to be independent of the application control algorithm. The health of the MCU system is verified before the application algorithm is started. The MCU system is then verified concurrently as the algorithm executes. The described implementation reduces sensitivity and ensures integrity of the complete MCU system during all forms of environmental stress (Electromagnetic fields, RFI transient noise, thermal cycling/shock, etc.). The Secured Microcontroller Architecture also increases the system reliability by decreasing component count, interconnections and simplifying fail-silent software.

BRIEF DESCRIPTION OF THE DRAWINGS

Other advantages of the present invention will be readily appreciated as the same becomes better understood by reference to the following detailed description when considered in connection with the accompanying drawings wherein:

FIG. 8 is a block diagram of the stand alone Data Stream Monitor (DSM) module (forground and background subsystems), and the Dual Central Processing Unit/Functional Compare Module (DCPU/FCM) along with peripheral module redundancy or BIST circuits, which comprise the complete Secured Microcontroller Architecture (SMA) system. Both the Data Stream Monitor (DSM) and Functional Compare Module (FCM) logic having a connection to an external Microcontroller Unit (MCU) fault pin, and capable of also generating an internal system interrupt.

DETAILED DESCRIPTION OF THE PREFERRED EMBODIMENT

Figure 1:
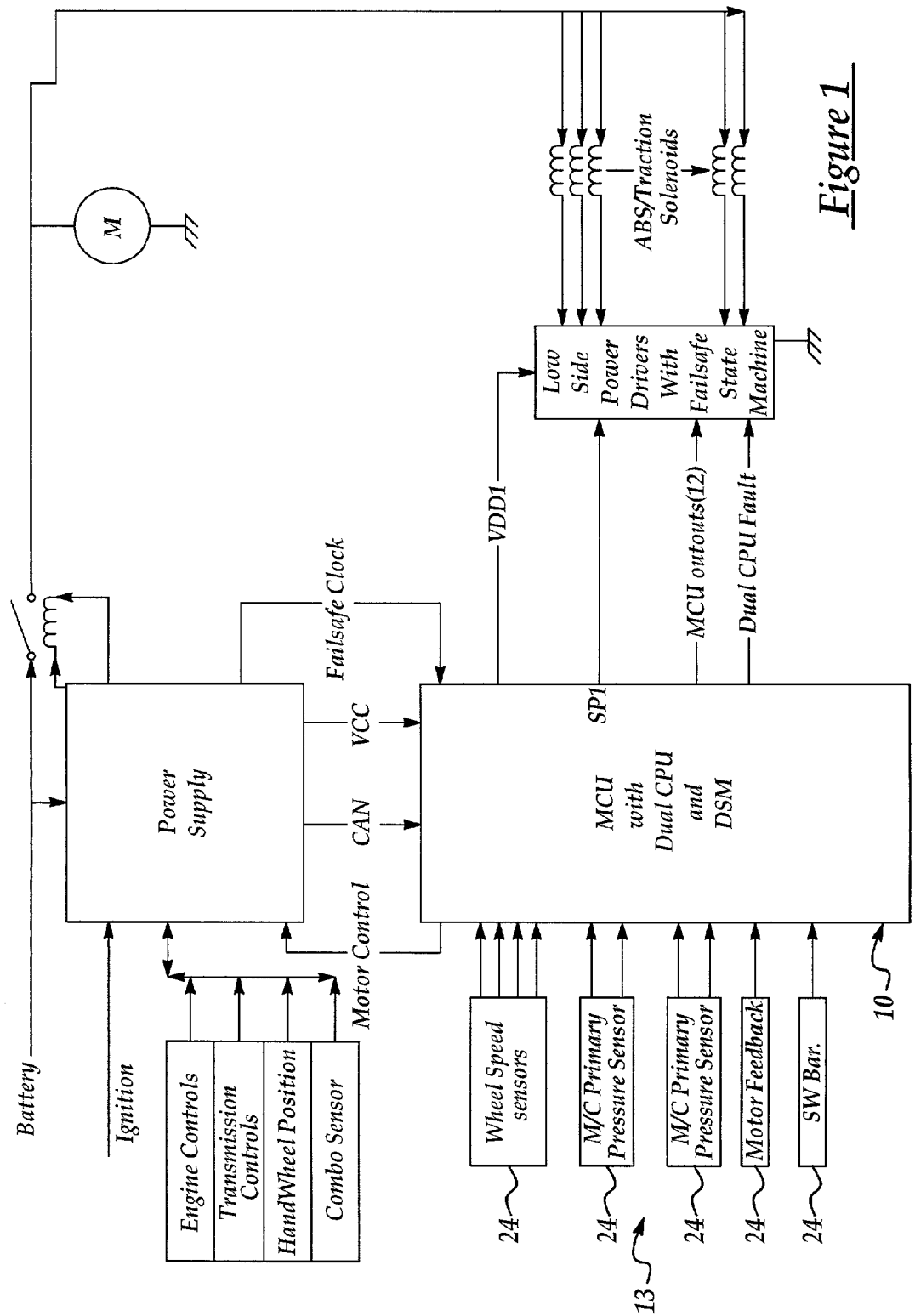
FIG. 1 is a block diagram of an embedded microcontroller having a dual CPU/FCM/DSM, a dedicated diagnostic register stack for the second CPU, and other support test control registers according to an embodiment of the present invention.

Although the invention is described and illustrated in terms of several particular embodiments, the teachings of the present invention may be modified for other system fault analysis. The present invention is particularly suitable for use in automotive applications such as anti-lock braking systems, airbag systems, steering modules and "X-by-wire" applications. "X-by-Wire" applications include steer by wire, brake by wire, electronic throttle control and electronic airbag deployment. "X-by-Wire" applications due to their importance to vehicle operation will depend on real-time system verification. Other automotive applications include collision avoidance systems and adaptive cruise control. The present invention may be used for other applications outside the automotive realm. Examples include the medical field in such devices as pacemakers, heart-lung machines, aviation and marine navigation electronics. It is also likely that this invention will comprise a role in smart actuators or smart sensors for a wide variety of mission critical systems. The present invention may be used together with a particular microprocessor circuit or as a stand-alone module suitable for use without alteration to various microprocessors.

The following references are herein incorporated by reference: R. A. Frowerk, "Signature analysis: a new digital field service method" Hewlett-Packard Journal, pp. 2–8 May 1977; H. J. Nadig, "Signature analysis—Concepts, Examples, and Guidelines" Hewlett-Packard Journal, pp.15–21 May 1977; S. W. Golomb, "Shift-Register Sequences," Holden-Day, Inc., San Francisco, 1967; J. Sosnowski, Concurrent Error Detection Using Signature Monitors. Proc of Fault Tolerant Computing Systems, Methods, Applications, 4th International GI/ITG/GMA Conference, September 1989, pp 343–355; K. Wilken, J. P. Shen, "Continuous Signature Monitoring: Low-Cost Concurrent Detection of Processor Control Errors," IEEE Transactions on Computer-Aided Design, Vol. 9, pp. 629–641 June 1990; Intel Corporation, Embedded PentiumR Processor Family Developer's Manual, "Error Detection," Chapter 22, pp. 393–399; E. Bohl, T. Lindenkreuz, and R. Stephan, "The Fail-Stop Controller AE11," Proc. International Test Conference, IEEE Computer Society Press, Los Alamitos, Calif., 1997, pp. 567–577; Bardel, W. H. McAnney, J. Savir, "Built-In Test for VLSI: Pseudorandom Techniques," IBM Corp., John Wiley & Sons, 1987; J. Wakerly, "Error Detecting Codes, Self-Checking Circuits and Applications," Elsevier North-Holland, Inc. 1978-section 2.1.6 error correction (syndrome testing); Zvi Kohavi, "Switching and Finite Automa Theory," McGraw-Hill Inc., 1978, section 1.3, pp 14–21; J. Sosnowski, "Evaluation of transient hazards in micro-processor controllers," in Proc. of 18th IEEE FTCS, 1986, pp. 364–369; P. K. Lala, "Digital Circuit Testing and Testability," Academic Press Inc., 1997; D. A. Anderson, G. Metze, "Design of Totally Self-Checking Circuits for m-Out-of-n Codes," IEEE Transactions On Computers. Vol C-22. NO. 3, March 1973; and T. L. Fruehling "Delphi Secured Microcontroller Architecture" SAE 2000 World Congress, Detroit, Mich. Mar. 6–9, 2000, pgs. 1–12.

Figure 2:
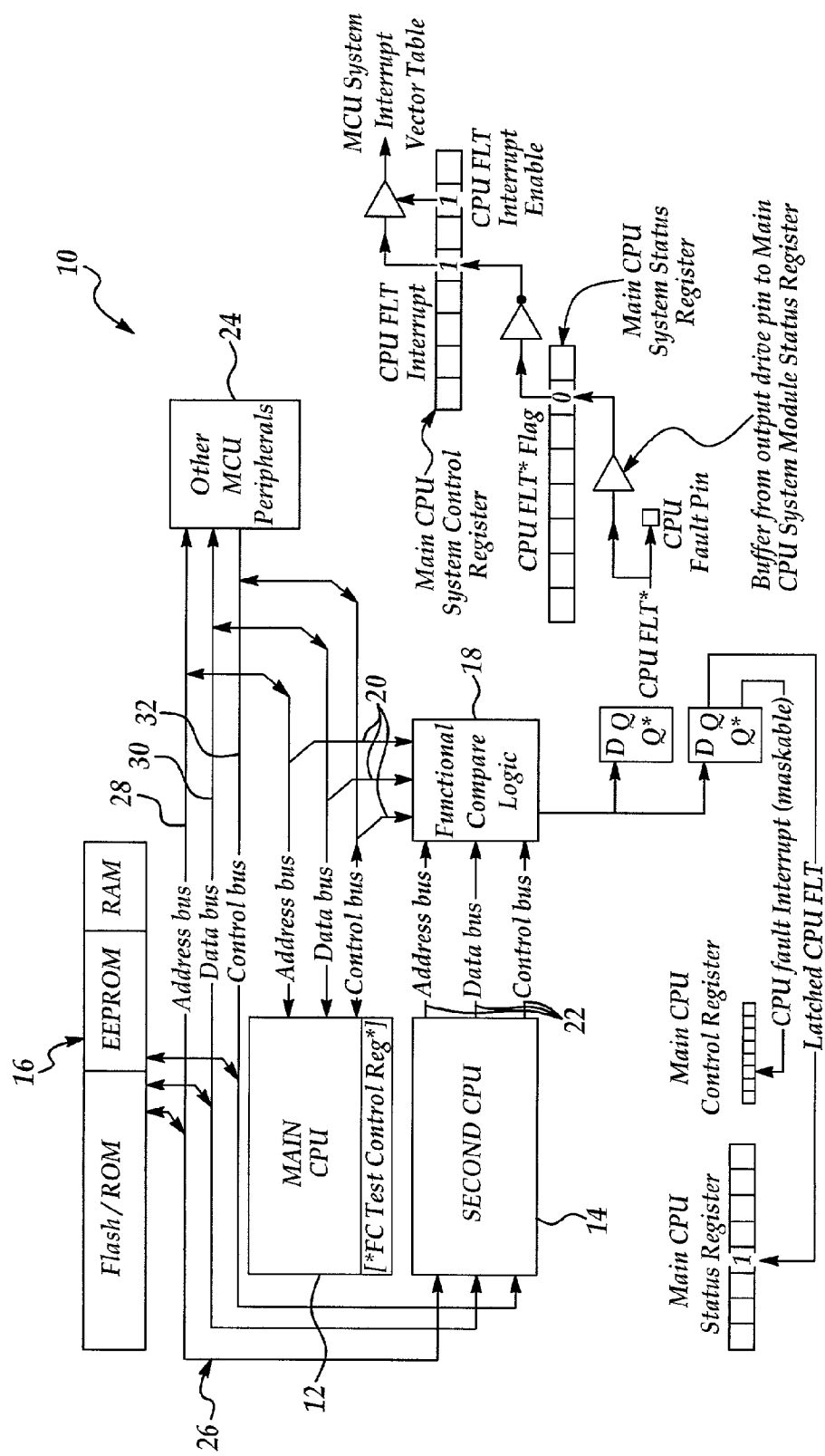
FIG. 2 is a block diagram of the dual CPU/FCM/DSM, a dedicated diagnostic register stack for the second CPU, and other support test control registers adapted to generate a new fault interrupt in response to an external fault.

Referring to FIGS. 1 and 2, a microcontroller unit (MCU), i.e., controller, is shown generally at 10. The MCU 10 includes a primary, or main, processing unit 12, a secondary processing unit 14 coupled to the primary processing unit 12, and a common memory 16 coupled to the primary and secondary processing units 12, 14. The MCU 10, if dedicated to the control of one vehicle sub-system, is considered to be embedded in that subsystem. Further, when the MCU 10 is part of an application Electronic Control Unit (ECU) which contains interface circuits supporting specialized I/O requirements, the combination may be referred to as an embedded controller. The controller 10, being embedded, creates a layered fault detection organization that facilitates a bootstrap sequencing, which is described below. The common memory 16 contains a control algorithm, which is executed by the primary and secondary processing units 12, 14. The common memory 16 may be any type of memory, such as RAM, ROM/FLASH, EEPROM, and other similar memory types.

A functional compare module 18 is coupled to the primary processing unit 12 and the secondary processing unit 14 for comparing a primary output 20 of the primary processing unit 12 and a secondary output 22 of the secondary processing units 14 concurrently as the control algorithm has been run by the primary and secondary processing units 12, 14. The functional compare module 18 is adapted to detect a fault if the primary output 20 and the secondary output 22 are not the same. In the preferred embodiment, the primary output 20 and the secondary output 22 are data, address, and control signals. The functional compare module 18 may also be adapted to perform self-diagnostics upon startup and concurrently as the MCU controller 10 executes the application program. In other words, the CPU 12, 14 operation is verified and then the peripherals are verified, continuously during use of the system. The secondary CPU 14 operates in lockstep operation with main CPU 12 by receiving all the same inputs as the main CPU 12 but its only output is to the functional compare module 18. The functional compare module 18 compares the address, data, and control outputs of the main and secondary CPU 12, 14. If a fault occurs the system outputs are disabled, but leaves the CPU active to aid in diagnostics.

The controller 10 further includes at least one peripheral module 24 coupled to the primary processing unit 12. These can include communication devices such as serial peripheral interfaces, as well as timers, auxiliary power supplies, A/D converters and other devices, built on the same integrated circuit. The controller 10 also includes at least one bus, wherein the common memory 16, the primary and the secondary processing units 12, 14, and the functional compare module 18 are coupled to the at least one bus 26. The bus includes at lease one of an address bus 28, a data bus 30, and a control bus 32, and the controller 10 preferably includes one of each. The functional compare module 18 is adapted to read signals on the at least one bus, generate a signature of the signals, compare the generated signature with a reference signal and detect a fault if the signals are not the same.

Figure 3:
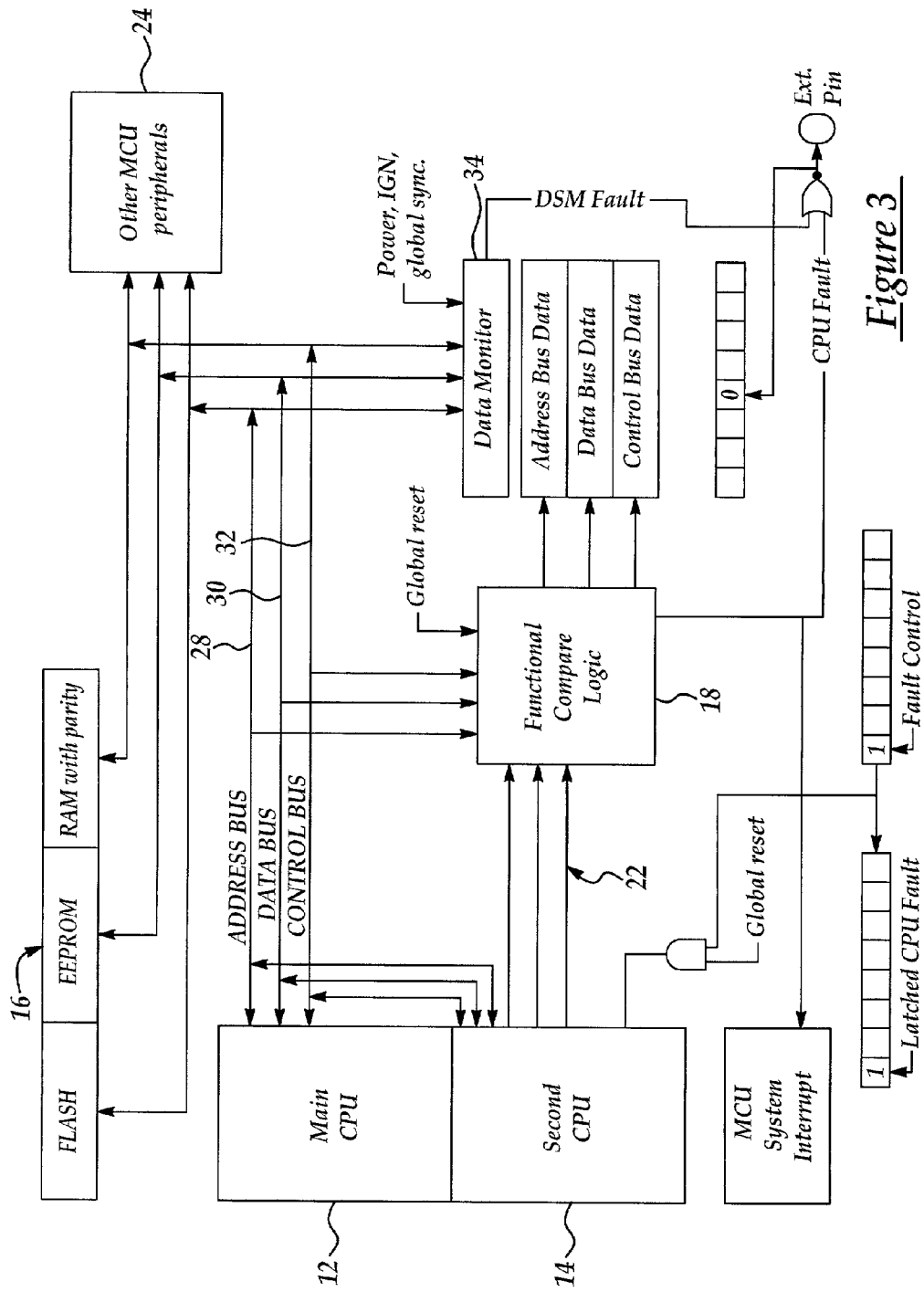
FIG. 3 is a block diagram of the dual CPU having enhanced diagnostic capabilities that can detect faults and latch the status of both CPUs and the MCU at the time of the fault event.

Referring to FIG. 3, the subject invention further includes a data stream monitor 34 (DSM). The DSM 34 is a memory mapped module designed for autonomous and concurrent background testing of memory. In addition this module 34 is capable of signaturing data streams while the CPU is on the bus. The controller 10 may also include a secondary clock oscillator and an error detection circuits, as described above. The dual CPU 10 is also adapted to distinguish between internal and external faults. With reference to FIG. 2, the adapted architecture generates a new fault interrupt in response to an external fault. Thus interrupt will be of lower priority than a CPU or DSM fault interrupt. In one embodiment, the subject invention will also distinguish and discriminate what task either of the CPUs 12, 14 of the MCU 10 is performing at the time of the interrupt.

In one embodiment, the primary processing unit 12 is coupled to a system 13 for control of the system 13 and the secondary processing unit 14 is adapted to control the system 13 if a fault is detected in the primary processing unit 12. The secondary processing unit 14 may also be coupled to a second system (not shown) for control of the second system.

The subject invention provides a method for detecting a fault in the controller 10. The method includes the steps of reading a control algorithm stored in the common memory 16 by the primary processing unit 12, reading the control algorithm stored in the common memory 16 by the secondary processing unit 14, and comparing a primary output 20 of the primary processing unit 12 and a secondary output 22 of the secondary processing unit 14. If the primary output 20 does not match the secondary output 22, the controller 10 responsively detects a fault. In one embodiment, the primary output 20 and the secondary output 22 are data. It is also to be understood that the primary output 20 and the secondary output 22 may be control signals, address signals, or similar signals.

Figure 4:
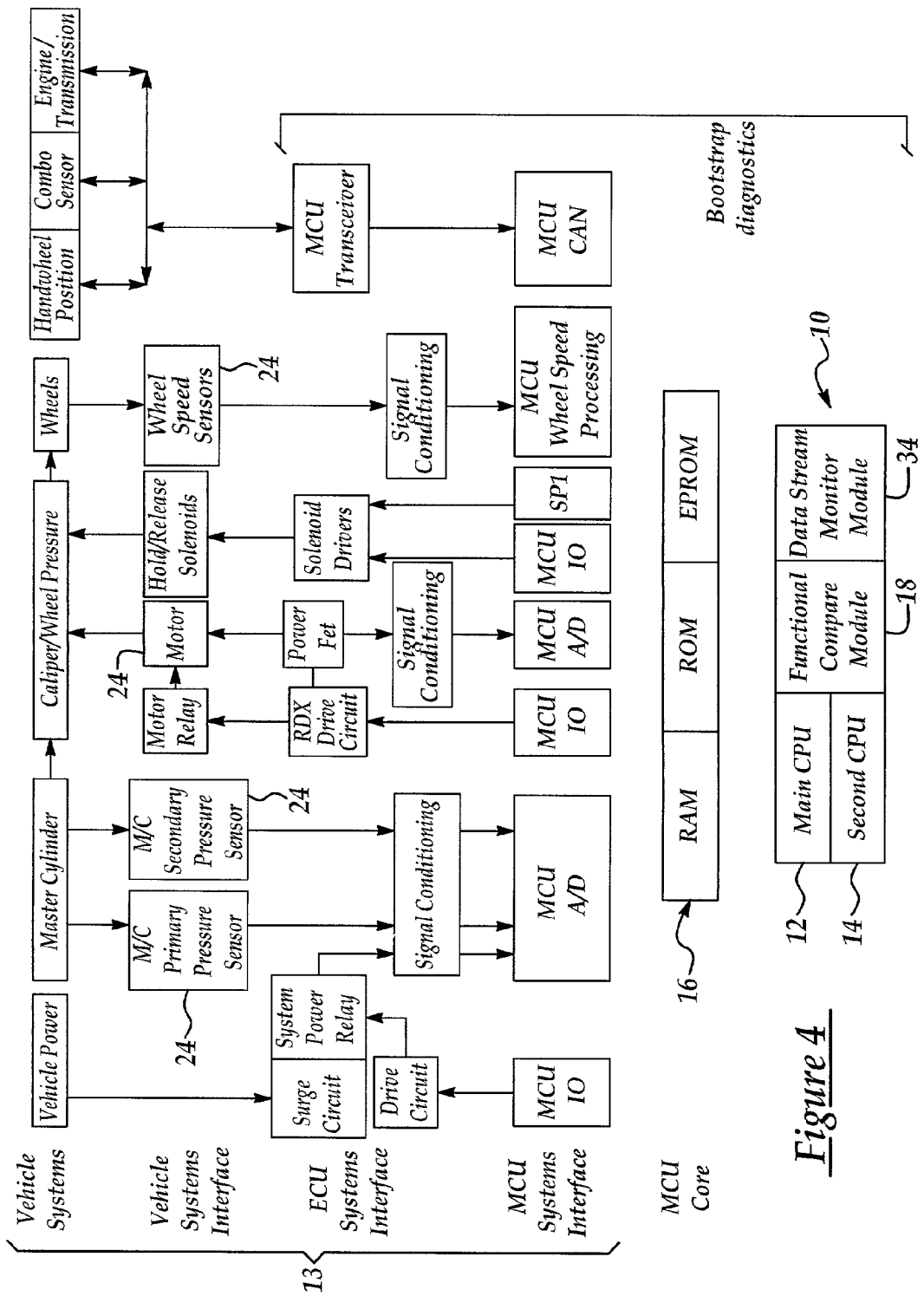
FIG. 4 is a block diagram of a layered model incorporating the present invention and is used for fault detection analysis in an ABS system; it also shows the realm of the enhanced bootstrap process, that in the present invention is not only run during initialization, but also runs concurrently as the application algorithm executes in real time.
Figure 5:
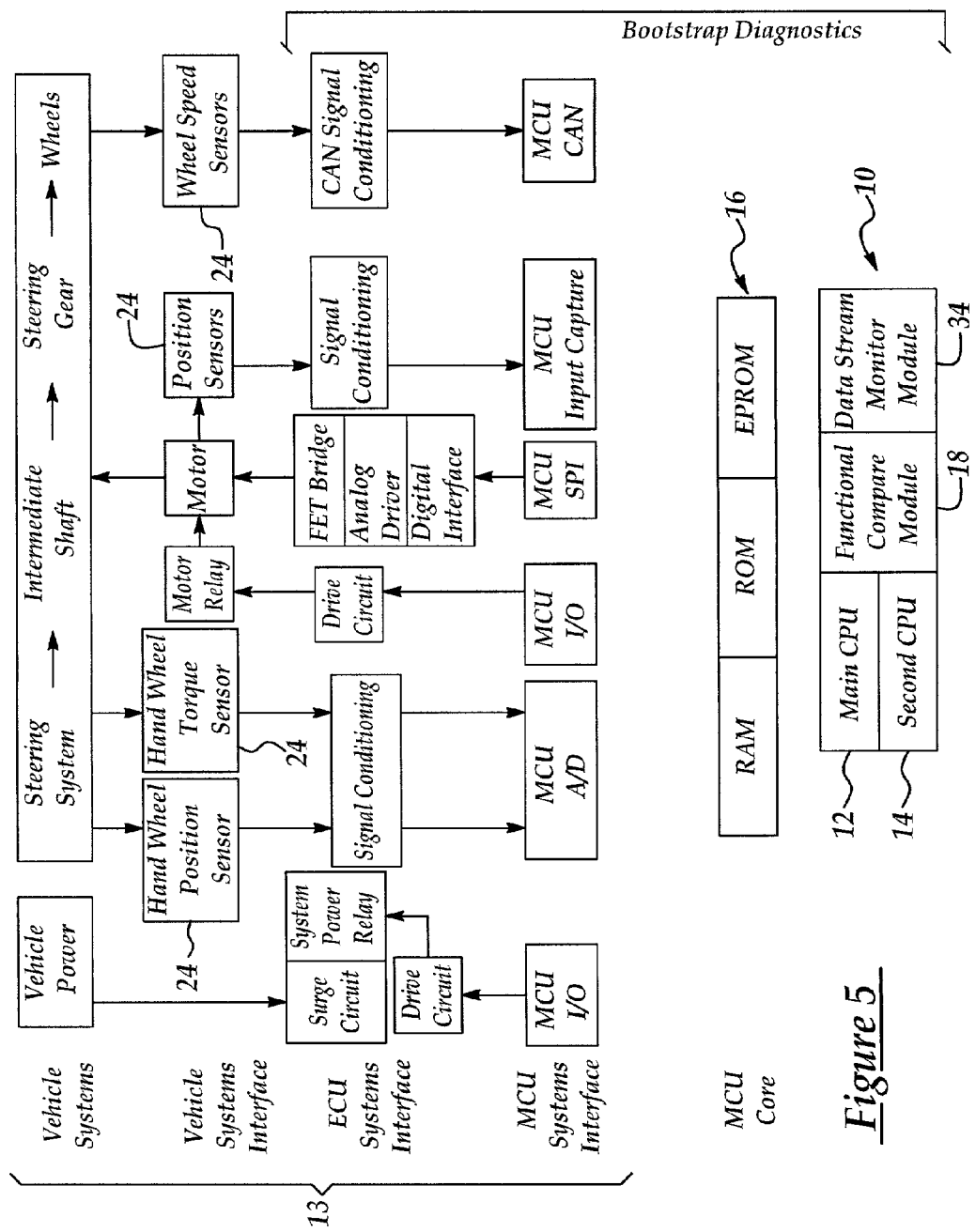
FIG. 5 is a block diagram of a layered model incorporating the present invention and is used for fault detection analysis in a steering assist system; it also shows the realm of the enhanced bootstrap process, that in the present invention is not only run during initialization, but also runs concurrently as the application algorithm executes in real time

The method further includes the step of performing diagnostics upon startup of the controller 10. The diagnostics performed are referred to above as a bootstrap process, which are illustrated in FIGS. 4 and 5. The enhanced bootstrap diagnostics are also performed continuously or as desired for the different applications. The diagnostics determine the correct operation of the CPU, memory and MCU's peripherals. The method may also include the step of detecting faults within the peripheral module 24 using a built in self-test (BIST) 25 circuit coupled to the primary processing unit 12, or multiple signature monitors, as shown in FIG. 6.

Figure 6:
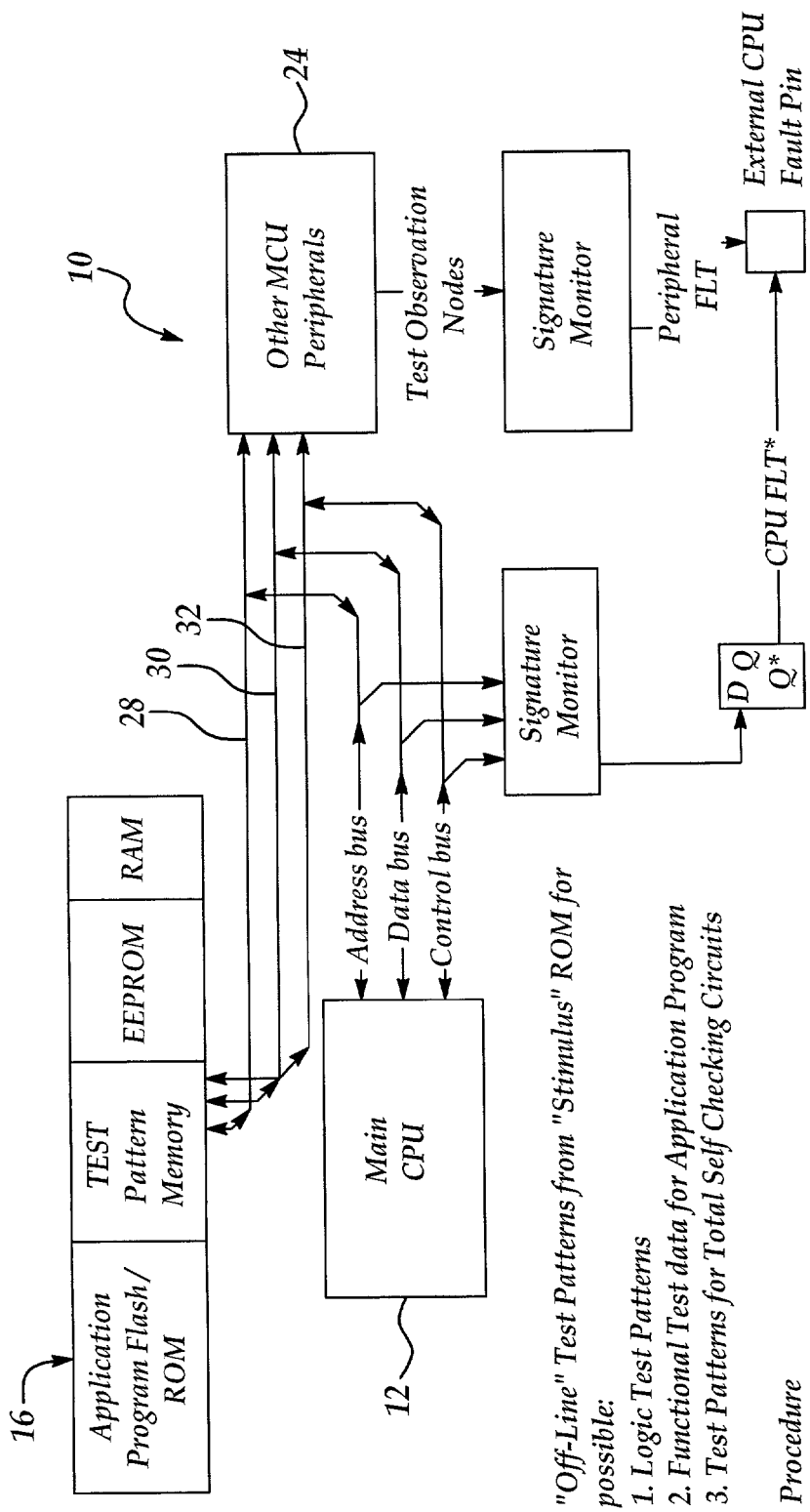
FIG. 6 is a block diagram of the present invention illustrating the concept of a "test" or "stimulus" ROM and multiple signature monitors (Data Stream Monitors—DSM) to test MCU peripherals and their integration into a fail-silent system.

Referring to the schematic illustrated in FIG. 6, the method further includes the steps of generating a special set of inputs via CPU 10 and monitoring the capability of the peripheral under test (such as the Functional compare module or other peripherals 24) to generate the correct response. The CPU 10 and application algorithm or a test algorithm can also be signatured to ensure that the test ran properly, and further responded correctly to the generated signals. The set of inputs includes test vectors are generated and injected to evaluate the chosen peripheral and the capability of the CPU 10 to properly process, and produce the correct resultant data at circuit specific observation points. The method also includes the steps of reading signals on the at least one bus, generating a signature of the signals, comparing the generated signature with a reference signal, and detecting a fault if the signals are not the same.

When the system detects a fault, the secondary processing unit 14 controls the system if the fault is detected in the primary processing unit 12. For the embodiment wherein the secondary processing unit 14 is connected to the second system, the secondary processing unit 14 still maintains control of the second system while controlling the system.

The purpose of the secondary CPU 14 is to provide a clock cycle by clock cycle check of the primary CPU 12 in a functional comparison module 18. If the data from the memory is corrupt, it will be discovered by the Data Stream Monitor module 34.

To ensure that the CPUs 12, 14 are healthy, both CPUs 12, 14 must respond to the same data in the same way. The MCU 10 employs continuous cross-functional testing of the two CPUs 12, 14 as multiple paths are taken through the application algorithm, as describe above. It should be noted, that if the system dwells in one software module or mode disproportionately to others, the testing by the Dual CPU 10 is similarly proportionate.

The bootstrap process, as mention above, is dependent on verifying the CPU first and then the MCU peripherals 24. The bootstrap process is run during the initialization phase and during repetitive execution of the control program. It is therefore advantageous to the execution speed of this method to incorporate peripheral BIST 25 circuits that are independent of, and require minimal interaction with the CPU. The secondary processor 14 and functional compare module 18 runs concurrent with the main control processor 12, and consumes no system resources until a fault is detected. There is a software module that will perform initial CPU configuration (such as setting up control registers in peripheral modules, clearing internal registers and testing the functional compare module 18) and handle faults diagnostics, however this code does not execute concurrently with the application software. The order and priority that MCU peripherals 24 or ECU subsystem circuits/ICs are validated is dependent on its hierarchical location within the bootstrap process. Because of the sequential nature of the bootstrap method and since this scheme is run at the initialization phase and during repetitive execution of the control program, the speed at which the CPU can detect faults in the MCU 10 support peripherals is essential.

The DSM 34, described above, runs concurrently and autonomously in background mode and in the start up initialization mode. There is configuration and test software that checks the DSM 34 and handles faults but this code does not execute concurrently with the application software. When the foreground DSM 34 operates for dynamic verification, there is a slight impact on CPU resources. The system takes advantage of continuously varying execution threads through the application code and the random-like data that occurs in actual use, to detect faults. A benefit of the system is that the real time CPU's and software execution testing is automatically proportionate to the time the system dwells in any mode. In actual use, the control program can run many times without going through every possible code path. When a particular thread through the algorithm inevitably does execute, the system provides the following safeguards. First the dual CPU 10 serves as a runtime functional check on the processing of code, data and output controls as it executes. Second the data stream monitor 34 ensures that the code and data signatures, presented to the dual CPU 10 at runtime, match the code and data signatures that were generated when the code was compiled. Third the data stream monitor can signature the configuration registers of the MCU peripheral modules and ensure their proper initial and continuous conditions.

Referring now to FIGS. 2 and 3, the MCU 10 is shown having a bus 26 coupling together various peripheral modules. The bus is illustrated as a data bus 30, a control bus 32, and an address. The control bus 32 operates the timing and control of the various system module peripherals such as enable/disable DMA Request/DMA Grant, Bus Request/Bus access grant, CPU Idle Bus, external interrupt, interrupt request/grant, Data/Address Valid, and instruction/data fetch functions.

The address bus 28 carries the address locations of the system memory and peripherals as might be directed or requested by the CPU's 12, 14 or any peripheral 24 that needs to drive the bus 26. The data bus 30 transmits data. This data can be either instruction opcode/operand data or external data as might be collected from a peripheral sensor and converted by and A/D converter, or digitized Wheel-speed information. The control signals generated by the secondary CPU 14 go directly to functional compare module 18. The secondary CPU 14 gets all the same inputs as the main CPU 12, but the output of secondary CPU 14 only gets routed to functional compare module 18. Address signals are compared by the functional compare module during all memory or register access cycles. Gating logic ensures that the functional compare module 18 only compares on data on write cycles and only when the CPU drives the bus. Similar logic ensures that functional compare module 18 only examines the correlation between the control signals generated by both the main CPU 12 and secondary CPU 14.

The functional compare module 18 includes four possible modes. In a first mode, the functional compare module 18 captures a fault and latches the dedicated output fault pin. The fault pin acts to disable the peripheral drive systems (such as a power relay, or the enable line of select ICs such that system function is inhibited). In this mode the system can discriminate between an internal or externally generated fault (refer to FIG. 2). Both CPUs will continue to run.

In a second full diagnostic mode, a non-maskable interrupt (NMI) is also generated. (The action of the CPU fault pin remains is the same as mode one) The second CPU having it's own set of diagnostic registers (non-volitile) will be latched during the fault. The second CPU diagnostic stack will include but not limited to, CPU accumulators, CPU special function registers, and functional compare module status registers (address, data, and control—see FIG. 3). Further it will include the program counter, program status register, and system exception register. The interrupt service routine for the non-maskable interrupt will then first move the CPU accumulators, CPU special function registers, program counter, program status register, and system exception register to memory locations for nonvolatile storage (such as EEPROM), although volatile keep alive RAM could also be used.

Then the program stack could be stored in a similar fashion. This is enough to capture the status of both CPU's at the time of the fault. The program stack can be further used to diagnose what the main control CPU was doing at the time of the fault. After the NMI service routine is completed the CPU's will be returned to the state that the main CPU was in prior to the NMI and continue executing the application code. This is the preferred embodiment, however it is conceivable that the second CPU could be halted after the fault to latch the information stored in it's internal registers. These diagnostic features can be used by an engineer using external tools to determine the cause of the fault, or an application algorithm could be used to determine the extent of the fault to determine if the fault condition is recoverable, support corrective actions, or if the system is to remain inhibited.

In a third mode, the functional compare module 18 identifies a fault and resets one or both of the CPUs 12, 14. This mode would allow the fault conditions to be latched across resets for diagnostic purposes. Also, only the registers that do not match may be stored, which saves memory.

In the fourth mode, the functional compare module 18 can also be used to identify and keep a running count of the number of faults. This requires a separate software driven output pin, to perform a system shutdown. This is to support a multiple pass system where the faults could be counted using the CPU FLT * Flag to validate the existence of a non-transient failure (FIG. 2). The functional compare module 18 may be adapted to perform one of the modes identified above or may perform in a specific mode as a function of the nature of the fault detected.

The primary CPU 12 may be used to check the operation of the functional compare module 18 by simulating a fault, i.e., generating a simulated CPU fault. The functional compare module, being comprised of self Checking circuits can also be tested by subjecting the module to appropriate test vectors to perform 100% fault grading of the module, and determine the presents of a stuck-at-one or stuck-at-zero fault. This is also depicted in FIG. 6. The secondary CPU 14 may also be used to perform other system functions as needed or until needed.

Referring to FIG. 3, the system is illustrated to show the enhanced diagnostic capabilities of the Dual CPU 10 that can detect faults and latch the status of the MCU 10 at the time of the fault event.

The microcontroller 10 unit may also have the flash/ROM memory, the EEPROM memory, or the RAM memory coupled to bus 26, as described above. Each of the types of memories has various numbers of registers that are addressed. The various types of memories associated with bus 26 will vary depending on the application for MCU 10.

Memory mapped peripherals, although shown as an internal part of the MCU 10, may also be externally located to the MCU 10 but inside the electronic control unit, and still be coupled to bus 26. When the embedded MCU 10 allows external peripheral connections to directly access the bus, it is considered to be in an "expanded" mode of operation. These memory mapped peripherals include serial communication peripherals or automotive class II communication links (single wire J1850) may be coupled to bus 26. Further, general purpose timers such as pulse width modulation module, general purpose inputs such as A/D converters and input capture modules, application specific modules such as the Adaptive Braking System (ABS), Wheel Speed Integration (WSI) Module, or the Magnetic Variable Steering Assist (MSVA), Current Control Module (CCM) may also be coupled to bus. Optionally, memory mapped I/O devices such as configurable I/O ports, pulse receiver modules (programmable Schmidt trigger inputs), or relay or lamp line driver modules may be coupled to bus.

The MCU 10 has a built in self-test module 25 coupled to bus 26. The BIST 25 as will be further described below is used as a real time parallel signature analyzer (PSA) for analyzing various aspects of MCU 10. For example, memory may be analyzed by the BIST 25. The BIST 25 may be used to validate other operational aspects of the MCU 10 such as signaturing any type of data streams (such as instruction data or parametric data). The BIST 25 may be memory mapped onto the bus 26 and, therefore, has minimal design impact on the MCU 10. By memory mapping the BIST 25, it acts as any other peripheral 24. The BIST 25, if truly built-in, requires silicon space and requires decoding of the devices internal registers to the MCU 10. Signaturing various aspects of the operation of the MCU 10 may take place in various modes of operation. For example, in totally autonomous mode, "background" mode no CPU/Software intervention is required. The apparatus maintains its functionality independent of the state of health of the CPUs 12, 14.

In a semi-autonomous mode, "foreground" mode, the apparatus is under direct but limited CPU/Software control. This mode is used to accomplish block validation of data streams, or to use a sectored approach to validate MCU 10/Peripheral configuration (status or control) registers. This method will be used to also accommodate any noncontiguous memory array.

In a non-autonomous mode (under direct and continuous CPU/Software control), automotive tech tool interface is supported, so that the device, which has this feature, can be diagnosed on the vehicle. The MCU 10 can operate under remote command of such a tool, to run user selected tests.

Figure 7:
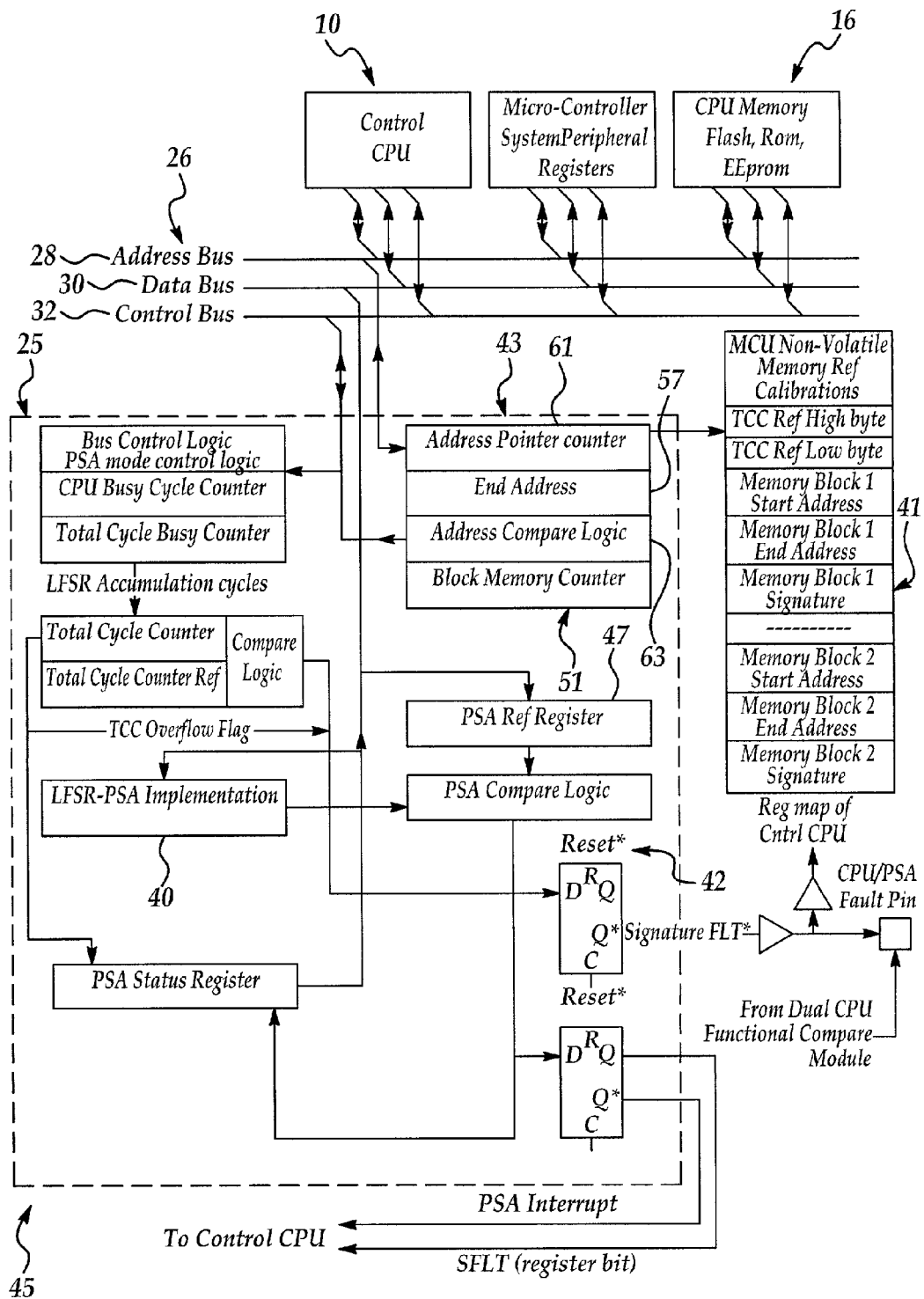
FIG. 7 is a block diagram of a stand alone module having a data stream monitor that is responsible to validate memory at system initialization and concurrently via CPU idle bus, or by forcing CPU bus free cycles as the application executes.

BIST 25, referring to FIG. 7, is comprised of a register such as a linear feedback shift register (LFSR) 40. As will be further described below, the LFSR 40 is coupled in parallel to the bus 26. However, one skilled in the art would recognize that LFSR 40 may also be coupled serially to bus 26 without deviating from the scope of the invention. Further, the dedicated CPU could be programmed to collect data from the bus 26 and perform the polynomial division accomplished by the LFSR 40. LFSR 40 may also have the DSM reference calibration data register block 41 (shown in FIG. 7 as an external dedicated non-volatile memory block, it could also be implemented internal to the DSM 25), and a controller such as an LFSR control register 43 associated therewith. As illustrated above, the LFSR 40 may be incorporated into MCU 10.

Referring now to FIGS. 7 and 8, the data stream monitor 34 having a parallel signature analyzer (PSA) 42 is incorporated into a stand-alone module 45. When implemented properly for the application, the PSA 42 is capable of accomplishing a form of data compression on extremely long data streams. The result of the data compression, referred to as the "signature", is held in a register 47 where comparison to a reference value can be made for fault determination. The stand alone module 45 may be coupled to the bus 26 of various MCUs 10. In this example, the MCU 10 has a control CPU 12, an assortment of peripherals 24, and a CPU memory 16. The bus 26 may comprise an address bus 28, a data bus 30, and a control bus 32. As one skilled in the art would recognize, a second CPU 14 may also be incorporated into the system as described above with FIG. 1. Each of the main CPU 12, peripherals 24, and memory 16 may be coupled to address bus 28, data bus 30, and control bus 32.

FIG. 7 shows the subsystem of the DSM 34 that is responsible to validate the memory at start-up by halting the CPU and concurrently as the application executes by using CPU idle-bus-cycles or by stealing a cycle if needed. All memory blocks 51 are automatically clocked into the stand alone module 45. The stand alone module 45 is independent of the state of the health of the MCU 10. If a fault occurs all internal registers are latched for enhanced diagnostics.

In one mode the DSM 34 can take advantage of, or steal, idle bus cycles from the CPU 12. This is referred to as the background mode because the CPU 12 is not driving the bus 26. During these cycles the DSM 34 has the capability of autonomously downloading the contents of memory onto the system data bus 30. Each word of memory can be accumulated in the PSA 40 in one clock cycle enabling high-speed signaturing of memory. The DSM 34 is a bus "listening" device and is therefore non-intrusive and easier to implement. As a result of the polynomial divisions that generate the final signature, the probability of aliasing is virtually eliminated. In the Autonomous mode the DSM 34 can verify memory at startup and concurrently as the algorithm executes, independent of the CPU 12 or the CPU's "state of health".

Referring to FIG. 8, the DSM in this mode represents a complete hardware implementation and software support is not required. When a fault does occur, ECU output drivers (relays, solenoids etc.) are automatically disabled via a fault pin connected to the DSM 34 fault logic.

Within the stand-alone module 45, the bus control logic circuit 53 is coupled to the control bus 32. The bus control logic circuit 53 acts as a controller to control the operation of stand-alone module 45 for parallel signature analysis as will be further described below. A total cycle counter 55 with an overflow flag may be coupled to bus control logic circuit 53 to count total cycles available for accumulation into the LFSR, for some implementations of stand-alone module 45. A total cycle reference register may also be coupled to total cycle counter 55.

Various registers for holding data may be incorporated into the stand-alone module 45. For example, an end address register 57 and a start address register 59 may be used to store the start address and end addresses of the memory block within the memory range to be checked. An address counter 61 is used to count/increment and automatically point to the address locations between start address and end address register. An address compare logic circuit 63 is used to determine when the end address from end address register is reached.

LFSR 40 is generally known in the art. LFSR 40 is a parallel shift register that requires one clock pulse to load all bits of the data bus. LFSR 40 is shown coupled to data bus 30, address bus 28. LFSR 40 generates a signature representative of the operation to be checked. For example, if the contents of memory are to be checked, LFSR 40 generates a signature representative of the memory contents, if a comparison is made that is not proper, compare logic is coupled to output flip flops, to drive the fault pin or if enabled the interrupt.

Flip-flops may also be coupled to the overflow flag of the total cycle counter. Flip-flops may be latched and edge triggered, respectively. First output flip-flop may have a signature fault output that indicates that the status of the comparison is not proper. Output flip-flop may provide output to the control CPU through a buffer (if required) such as a register bit signature fault output and a PSA interrupt output. Signature fault output may be coupled to an external fault pin or other indicator of a fault.

Another method, according to the subject invention, is for detecting a fault in the controller 10 for use in a motor vehicle. The controller 10 includes the primary processing unit 12 coupled to the motor vehicle and adapted to perform a first set of functions and the common memory 16 coupled to the primary and secondary processing units 12, 14, and the common memory 16 containing a control algorithm, wherein the primary processing unit 12 is adapted to run the control algorithm. The method includes the steps of performing a set of primary test functions by the secondary processing unit 14, comparing a primary output 20 of the primary processing unit 12 after the control algorithm has been run and a test output of the secondary processing units 14, responsively detecting a fault in the primary processing unit 12, and, performing the first set of functions by the secondary processing unit 14 upon detection of a fault in the primary processing unit 12.

The method further includes the steps of performing a second set of functions by the secondary processing unit 14, performing a set of secondary test functions by the primary processing unit 12, and, wherein the secondary processing unit 14 is adapted to perform a set of secondary test functions, and responsively detecting a fault in the secondary processing unit 14, and, performing the second set of functions by the primary processing unit 12 upon detection of a fault in the secondary processing unit 14.

Yet another method for detecting a fault within a controller 10 is also disclosed. The controller 10 is adapted to control a system, and includes the processing unit and the common memory 16 coupled to the primary processing unit 12, the common memory 16 containing the control algorithm, wherein the primary processing unit 12 is adapted to run the control algorithm and to store data on the common memory 16 during runtime of the control algorithm. The method includes the steps of storing a set of data values on the memory, determining a first signature of the data values in real-time and storing the first signature on the common memory 16, and, subsequently retrieving the data and determining a second signature of the data values, and, comparing the first and second signatures and detecting a fault of the common memory 16 in response to the first and second signatures being different.

Obviously, many modifications and variations of the present invention are possible in light of the above teachings. The invention may be practiced otherwise than as specifically described within the scope of the appended claims.

What is claimed is:

1. A controller, comprising:
    a primary processing unit;
    a secondary processing unit coupled to the primary processing unit;
    a common memory coupled to the primary and secondary processing units, the common memory containing a control algorithm, wherein the primary and secondary processing units are adapted to run the control algorithm;
    a functional compare module coupled to the primary, processing unit and the secondary processing unit for comparing a primary output of the primary processing unit and a secondary output of the secondary processing units after the control algorithm has been run by the primary and secondary processing units; and,
    at least one bus, wherein the common memory, primary and secondary processing units, and function compare module are coupled to the at least one bus, wherein the functional compare module is adapted to read signals on the at least one bus, generate a signature of the signals, compare the generated signature with a reference signal and detect a fault if the signals are not the same.

2. A controller, as set forth in claim 1, wherein the functional compare module is adapted to detect a fault if the primary output and the secondary output are not the same.

3. A controller, as set forth in claim 1, wherein the primary output and the secondary output are data.

4. A controller, as set forth in claim 1, wherein the primary output and the secondary output are control signals.

5. A controller, as set forth in claim 1, wherein the functional compare module is adapted to perform diagnostics upon startup of the controller.

6. A controller, as set forth in claim 1, wherein the at least one bus includes an address bus, a data bus, and a control bus.

7. A controller, as set forth in claim 1, wherein the primary processing unit is coupled to a system for control of the system, and wherein the secondary processing unit is adapted to control the system if a fault is detected in the primary processing unit.

8. A controller, as set forth in claim 7, wherein the secondary processing unit is coupled to a second system for control of the second system.

9. A controller, comprising:
    a primary processing unit;
    a secondary processing unit coupled to the primary processing unit;
    a common memory coupled to the primary and secondary processing units, the common memory containing a control algorithm, wherein the primary and secondary processing units are adapted to run the control algorithm;
    a functional compare module coupled to the primary processing unit and the secondary processing unit for comparing a primary output of the primary processing unit and a secondary output of the secondary processing units after the control algorithm has been run by the primary and secondary processing units; and,
    at least one peripheral module coupled to the primary processing unit, wherein the at least one peripheral nodule includes a built in self test circuit for detecting faults within the peripheral module, the built in self test circuit being coupled to the primary processing unit.

10. A method for detecting a fault in a controller, the controller including a primary processing unit, a secondary processing unit coupled to the primary processing unit, a common memory coupled to the secondary and primary processing units, and at least one peripheral module coupled to the primary processing unit, including the steps of:
    reading a control algorithm stored in the common memory by the primary processing unit;
    reading the control algorithm stored in the common memory by the secondary processing unit;
    comparing a primary output of the primary processing unit and a secondary output of the secondary processing unit and responsively detecting a fault; and,
    detecting a fault within the peripheral module using a built in self test circuit coupled to the primary processing unit.

11. A method, as set forth in claim 10, wherein the primary output and the secondary output are data.

12. A method, as set forth in claim 10, wherein the primary output and the secondary output are control signals.

13. A method, as set forth in claim 10, including the step of performing diagnostics upon startup of the controller.

14. An apparatus for controlling a first system of a motor vehicle, comprising:
    a primary processing unit for performing a first set of functions with respect to the first system;
    a secondary processing unit coupled to the primary processing unit;
    a common memory coupled to the primary and secondary processing units, the common memory containing a control algorithm, wherein the primary and secondary processing units are adapted to run the control algorithm;

a functional compare module coupled to the primary processing unit and the secondary processing unit for comparing a primary output of the primary processing unit and a secondary output of the secondary processing units after the control algorithm has been run by the primary and secondary processing units; and, at least one bus, wherein the common memory, primary memory and secondary processing units, and function compare module are coupled to the at least one bus, wherein the functional compare module is adapted to read signals on the at least one bus, generate a signature of the signals, compare the generated signature with a reference signal and detect a fault if the signals are not the same.

15. An apparatus, as set forth in claim 14, wherein the first system is a brake system.

16. An apparatus, as set forth in claim 14, wherein the first system is a steering system.

17. An apparatus, as set forth in claim 16, wherein the steering system is a steer by wire system.

18. An apparatus, as set forth in claim 14, wherein the first system is an engine control system.

19. An apparatus, as set forth in claim 14, wherein the functional compare module is adapted to detect a fault if the primary output and the secondary output are not the same.

20. An apparatus, as set forth in claim 14, wherein the primary output and the secondary output are data.

21. An apparatus, as set forth in claim 14, wherein the primary output and the secondary output are control signals.

22. An apparatus, as set forth in claim 14, wherein the functional compare module is adapted to perform diagnostics upon startup of the apparatus.

23. An apparatus, as set forth in claim 14, wherein the secondary processing unit is adapted to control the first system if a fault is detected in the primary processing unit.

24. An apparatus, as set forth in claim 23, wherein the secondary processing unit is coupled to a second system for control of the second system.

25. An apparatus for controlling a first system of a motor vehicle, comprising:

a primary processing unit for performing a first set of functions with respect to the first system;

a secondary processing unit coupled to the primary processing unit;

a common memory coupled to the primary and secondary processing units, the common memory containing a control algorithm, wherein the primary and secondary processing units are adapted to run the control algorithm;

a functional compare module coupled to the primary processing unit and the secondary processing unit for comparing a primary output of the primary processing unit and a secondary output of the secondary processing units after the control algorithm has been run by the primary and secondary processing units; and, at least one bus, wherein the common memory, primary and secondary processing units, and functional compare module are coupled to the at least one bus, wherein the functional compare module is adapted to read signals on the at least one bus, generate a signature of the signals, compare the generated signature with a reference signal and detect a fault if the signals are not the same.

26. An apparatus, as set forth in claim 25, wherein the at least one bus includes an address bus, a data bus, and a control bus.

27. A method for detecting a fault in a controller for use in a motor vehicle, the controller including a primary processing unit, a secondary processing unit coupled to the primary processing unit, at least one peripheral module coupled to the primary processing unit, and a common memory coupled to the secondary and primary processing units, including the steps of:

reading a control algorithm stored in the common memory by the primary processing unit;

reading the control algorithm stored in the common memory source by the secondary processing unit;

comparing a primary output of the primary processing unit and a secondary output of the secondary processing unit and responsively detecting a fault; and, detecting faults within the peripheral module using a built in self test circuit coupled to the primary processing unit.

28. A method, as set forth in claim 27, wherein the primary processing unit controls a brake system.

29. A method, as set forth in claim 27, wherein the primary processing unit controls a steering system.

30. A method, as set forth in claim 29, wherein the steering system is a steer by wire system.

31. A method, as set forth in claim 27, wherein the primary processing unit controls an engine control system.

32. A method, as set forth in claim 27, wherein the primary output and the secondary output are data.

33. A method, as set forth in claim 27, wherein the primary output and the secondary output are control signals.

34. A method, as set forth in claim 27, including the step of performing diagnostics upon startup of the controller.

* * * * *